(12) United States Patent
Maynard

(10) Patent No.: US 8,220,049 B2
(45) Date of Patent: Jul. 10, 2012

(54) HARDWARE-BASED DETECTION AND CONTAINMENT OF AN INFECTED HOST COMPUTING DEVICE

(75) Inventor: William P. Maynard, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 970 days.

(21) Appl. No.: 11/647,895

(22) Filed: Dec. 28, 2006

(65) Prior Publication Data

US 2008/0163370 A1    Jul. 3, 2008

(51) Int. Cl.
*G06F 12/14* (2006.01)
(52) U.S. Cl. ............. 726/22; 726/23; 726/24; 713/188; 713/189; 709/224
(58) Field of Classification Search ............... 726/22–24
See application file for complete search history.

(56) References Cited

U.S. PATENT DOCUMENTS

| | | | | |
|---|---|---|---|---|
| 5,001,704 A * | 3/1991 | Narup et al. | ................... | 370/402 |
| 6,687,833 B1 | 2/2004 | Osborne et al. | | |
| 6,996,843 B1 | 2/2006 | Moran | | |
| 7,032,114 B1 | 4/2006 | Moran | | |
| 7,032,244 B2 | 4/2006 | Wilkes | | |
| 7,107,347 B1 | 9/2006 | Cohen | | |
| 7,152,239 B1 | 12/2006 | Lyle et al. | | |
| 8,059,532 B2 * | 11/2011 | Riddle et al. | ................... | 370/230 |
| 2003/0004688 A1 * | 1/2003 | Gupta et al. | ................... | 702/188 |
| 2003/0200464 A1 * | 10/2003 | Kidron | ................... | 713/201 |
| 2004/0193892 A1 * | 9/2004 | Tamura et al. | ................ | 713/182 |
| 2005/0076228 A1 * | 4/2005 | Davis et al. | ................... | 713/188 |
| 2005/0108415 A1 | 5/2005 | Turk et al. | | |
| 2005/0182950 A1 * | 8/2005 | Son et al. | ....................... | 713/189 |
| 2008/0148036 A1 * | 6/2008 | Westerinen et al. | ............... | 713/2 |

OTHER PUBLICATIONS

Schmidt et al., Monitoring smartphones for anomaly detection, Feb. 2009,Journal Mobile Networks and Applications, vol. 14 Issue 1, pp. 92-106.*

* cited by examiner

*Primary Examiner* — David Pearson
*Assistant Examiner* — Amir Mehrmanesh
(74) *Attorney, Agent, or Firm* — Blakely, Sokoloff, Taylor & Zafman LLP

(57) ABSTRACT

Methods and apparatuses enable a traffic analyzer to monitor an internal connection of a computing system for one or more traffic patterns. The traffic analyzer compares traffic on the internal connection to an expected traffic pattern, and performs a policy based action based on the result of comparing the traffic pattern to the expected pattern. The traffic analyzer can exist in a stack of a VMM or a monitoring VM or be implemented in a management engine of the computing system. In one embodiment, the computing system includes traffic analyzer components in both a VMM or monitoring VM and a management engine.

21 Claims, 9 Drawing Sheets

US 8,220,049 B2

HARDWARE-BASED DETECTION AND CONTAINMENT OF AN INFECTED HOST COMPUTING DEVICE

FIELD

Embodiments of the invention relate to digital device security, and more particularly to detection and containment of infection of a computing system with a traffic analyzer that manages traffic on an internal connection of the computing system.

BACKGROUND

The proliferation of viruses and worms plagues all computer users from the home consumer to the large enterprise. Once a machine (e.g., a computer system) is compromised by a worm, the worm attempts to propagate across one or more networks to which the compromised machine is coupled. Many worm attacks attempt to propagate by looking for specific vulnerabilities on other machines on the network(s). Regardless of the vulnerability being exploited, the worm attacks share a common trait of propagation across all networks. That is, the worm attempts to propagate on all available network connections, or all network connections "visible" to the worm.

Traditional approaches to contain worms involve the use of virus detection software to detect the arrival of the worm in the infected machine. As long as the virus detection software is operational, and is capable of detecting the worm (e.g., there is a known or expected signature the software can look for), the virus detection software generally provides reasonable protection against the worms. The detection of the worms can be performed on request (e.g., a scheduled event or a scan triggered by a user, a program, or an external entity), or can be employed with heuristic analysis of all traffic that is sent over a network interface. The analysis of all traffic sent to the network interface is intrusive, and may significantly impact the network performance of the platform being protected with the analysis. For server platforms, where performance of the network interfaces is often critical, the intrusive analysis may be unacceptable. In particular, servers utilizing virtualization technology may also utilize directed input/output (I/O), which bypasses scanning mechanisms that perform intrusive traffic analysis. In such scenarios, the traffic analysis may be completely averted, and thus provide no protective benefit to the server. The tradeoff between the performance cost of intrusion detection and the risk of infection may favor opting out of intrusion detection.

DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
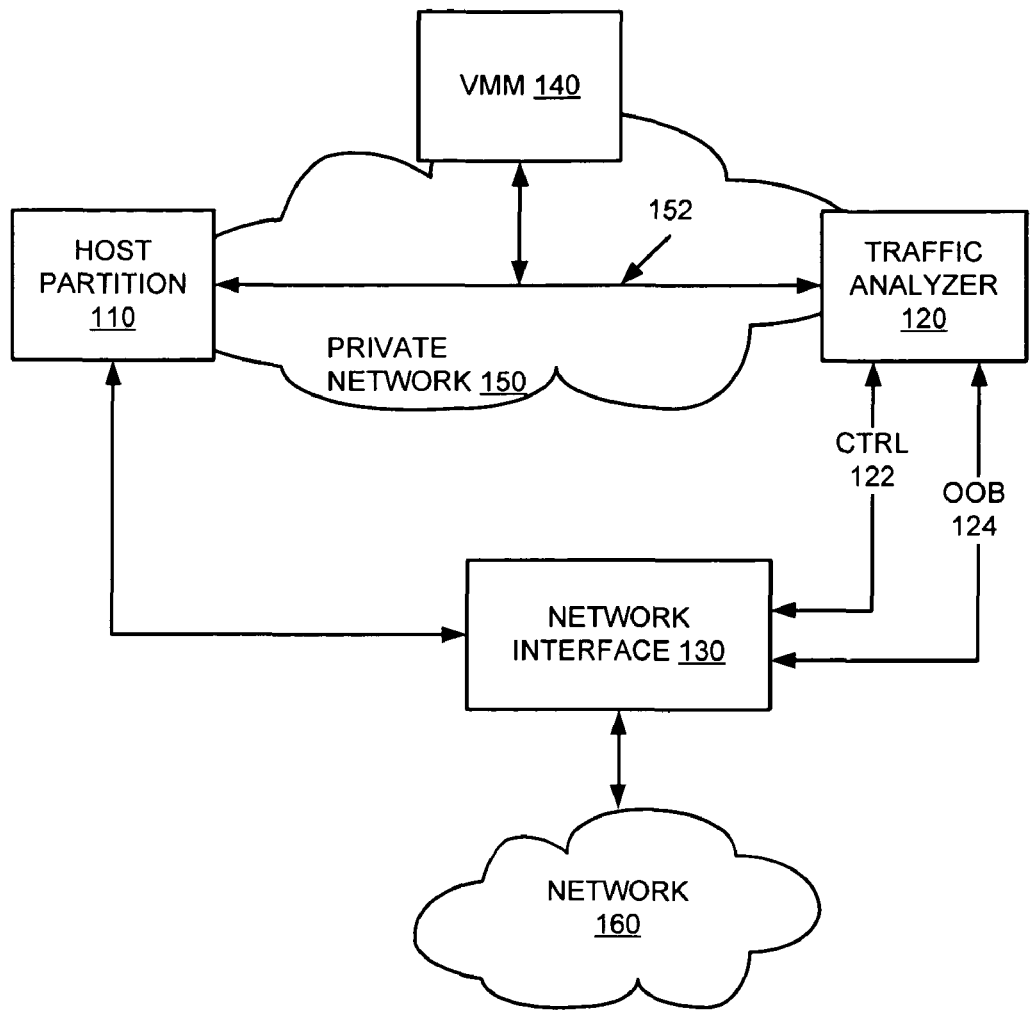
FIG. 1 is a block diagram of an embodiment of a system having a traffic analyzer on an internal connection of the system.

As used herein, references to one or more "embodiments" are to be understood as describing a particular feature, structure, or characteristic included in at least one implementation of the invention. Phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, with an overview description of embodiments of the invention, followed by a more detailed description with reference to the drawings.

A traffic analyzer can be placed on a connection internal to a managed computing device. The traffic analyzer can observe one or more traffic patterns on the connection to determine if a traffic pattern differs from an expected traffic pattern. The traffic analyzer includes any form of hardware and/or software that monitors traffic on a connection, and is more fully described below. The traffic analyzer monitors one or more internal connections for an expected pattern of traffic. Any traffic pattern outside the bounds of the expected traffic pattern could indicate the presence on the managed computing device of malware that is attempting to send traffic over the internal connection. In response to the observation of the traffic pattern, the traffic analyzer performs or triggers a security-policy based action. In a case where the traffic pattern is outside expected bounds, the policy based action may include active containment, and/or notification of a security administrator.

An internal connection refers to any signal line or group of signal lines, a bus, and/or a logical channel (or network "location") over which a communication can occur between entities of the managed computing device. The logical channels can include, for example, particular frequencies or wavelength, timeslot division, identifiers or tags, etc. The internal connection could also include one or more software elements (e.g., a driver used to communicate with an entity). On the internal connection, the entities refer to hardware and/or software elements of a particular hardware computing platform of the managed computing device. For example, connections could be made between chipset elements, between a central processing unit (CPU) and a management engine (ME), between virtual machines (VMs), etc., all of which can be considered "entities" on a computing platform for purposes herein. Any such connection between such entities could be considered to be an internal connection as discussed herein. An internal connection can be part of, or be, an internal network (or internal local area network (LAN)). An external connection, in contrast to an internal connection, refers to a connection from an entity on the host platform to an entity external to the host platform.

When malware breaches a host (a primary operating system (OS), or a guest OS running on a VM), it attempts to propagate itself through available or visible connections. A "visible" or available connection is one that the malware can identify and access. Malware typically cannot distinguish among various connections as to which are connections to external networks or to an internal network. Access to internal networks may be obtained in a similar fashion as an external network connection (e.g., through a similar driver), for example, for a connection dedicated to management or other controlled traffic. Thus, if a host has access to the internal connection, malware that infects the host typically will see the internal connection as a network connection that can be exploited to propagate the malware. While some malware attempts to broadcast on all available network connections, other malware is more sophisticated and only accesses a limited number of connections at a time, and may access a connection for only a limited time period. Whichever kind of malware infects the host, it is assumed that eventually the malware will attempt to access the internal connection that is monitored by the traffic analyzer.

The internal connection can be configured to have a particular expected traffic pattern known to the traffic analyzer. For example, in one embodiment, a particular internal connection may exist solely as a decoy connection. Thus, an expected pattern would be no traffic. Any traffic on the connection would be assumed to be malware activity. Furthermore, in one embodiment, such a connection may be configured as a honey pot, where a particular vulnerability or enticement is advertised on the connection, or the connection is configured to appear to malware to have a particular vulnerability or to otherwise be a desirable connection. In one embodiment, a particular identifier or tag (e.g., in a header) is used on an internal connection, and communication lacking such an identifier could be considered malware traffic. In one embodiment, communication on the internal connection should be performed in accordance with a particular pattern or protocol that would not be expected to be used by the malware, and traffic using another protocol would be considered outside the bounds of expected traffic. In one embodiment, the internal connection is used only for control or management functions, which could be distinguished from expected malware traffic. The bounds may be set by establishing a particular port and/or protocol. In all cases, whatever the specific implementation, certain bounds are placed on traffic on the internal connection to establish an expected pattern of traffic on the connection, and the traffic analyzer is aware (e.g., configured to recognize) of the expected pattern. The connection is then monitored to make sure all traffic on the connection is within the specified bounds. In one embodiment, monitoring the connection refers to monitoring a specific port. The port to be monitored could be an interface port (e.g., an internal network) or a specific protocol port (e.g., a TCP (Transport Control Protocol) port, a UDP (User Datagram Protocol) port, etc.).

The traffic analyzer can be implemented as hardware, software, and/or some combination. In one embodiment, the traffic analyzer is implemented as an element of a protocol stack. A protocol stack refers herein to a software implementation of a protocol, for example, a network communication protocol. The stack may contain various modules that each represents a layer of the stack (e.g., a media layer, a transport layer, an application layer, etc.). In one embodiment, the traffic analyzer is a module that is placed in the stack (e.g., below a TCP/IP (Transport Control Protocol/Internet Protocol) stack), and it analyzes traffic prior to sending the traffic up the stack (e.g., from low level to high level: sending the traffic to a transport layer, then to an application layer, etc.). In another embodiment, the traffic analyzer is a module that is placed in the stack above the transport layer.

In one embodiment, the traffic analyzer is implemented as part of a management engine (ME). The management engine may be, for example, a microprocessor on the computing platform (e.g., a component of the chipset). Thus, the traffic analyzer may be implemented in a hardware element coupled to the host processor that executes the host operating system. In another embodiment where virtualization is employed on the host platform, the traffic analyzer is implemented in a VM, which may be configured to monitor traffic on an internal connection. In one embodiment, the traffic analyzer is distributed among various elements, for example, part in a VM configured to monitor and part in an ME. In such a distributed implementation, the traffic analyzer component of each element can operate and coordinate with the other component(s), which would allow more sophisticated traffic analysis.

FIG. 1 is a block diagram of an embodiment of a system having a traffic analyzer on an internal connection of the system. System 100 represents a computing device or a computing platform with a connection to external network 160. System 100 includes host partition 110, which represents a primary partition of system 100. A primary partition refers to a partition on which a primary operating system (OS) of system 100 executes. Host partition 110 may be one of multiple partitions on the host platform of system 100, or it may be the sole partition. A partition refers to an execution environment operating on the host platform. When virtualization is employed, host partition 110 may be executing on the host platform concurrently with other virtual machines.

Host partition 110 is coupled to network interface 130. Unlike traditional intrusive traffic inspection, which requires all traffic to the network interface to pass through a filter, host partition 110 may route traffic to network interface 130 without adversely affecting the role of traffic analyzer 120. The connection between host partition 110 and network interface 130 may be, for example, directed network traffic that bypasses intrusive filter inspection.

Host partition 110 is coupled to traffic analyzer 120 over private network 150. As used herein, coupling refers to any type of connectivity, whether electrical, mechanical, and/or communicative. Coupling of one hardware component to another may occur through other hardware. Software components can be coupled to each other through function calls, or other invocations of a routine/subroutine. Hardware and software can be coupled through drivers or other software that enables a software module to provide control commands to a hardware component.

In an implementation with virtualization, system 100 includes VMM 140, which represents a VM manager that manages the VMs of system 100. In such an implementation, host partition 110 may represent one of multiple VMs in system 100. Additionally, traffic analyzer 120 may be a VM managed by VMM 140. In one embodiment, VMM 140 establishes private network 150 between host partition 110 and traffic analyzer 120.

Private network 150 represents an internal connection, or a connection within system 100 that is not accessible to elements external to the hardware platform of system 100. Thus, access to private network 150 is limited to components of hardware platform (whether software or hardware). Private network 150 include connection 152, which represents a specific connection coupling host partition 110 to traffic analyzer 120. Traffic analyzer 120 analyzes traffic on connection 152 to determine whether the traffic matches an expected pattern. Traffic analyzer 120 performs policy-based actions based on the observation of the traffic pattern. Policy-based actions are described in more detail below, and could include anything from doing nothing to isolating system 100 from external network 160. Note that with traffic analysis of traffic patterns, intrusive analysis of traffic signatures (which requires bit/byte analysis) can be avoided. Observation of general traffic trends can be performed without inspection of bit, which generally requires the buffering and comparing of bits.

In one embodiment, traffic analyzer 120 determines that access to certain or all network connections of network interface 130 to network 160 should be restricted. Such a determination is made in response to observation of traffic patterns on connection 152. Traffic analyzer 120 may be coupled to network interface 130 through a control connection (CTRL) 122 and/or through an out-of-band connection (OOB) 124 (which may also be referred to as OOB channel 124). Control connection 122 allows traffic analyzer 120 to pass control parameters to network interface 130 that, e.g., block access to certain ports or protocols. For example, in one embodiment, network interface 130 may be equipped with CIRCUIT BREAKER technology of INTEL CORPORATION of Santa Clara, Calif. Alternatively, or in addition, such control parameters could be passed over OOB connection 124. OOB connection 124 refers to a connection to network interface 130 and/or a connection to network 160 through network interface 130 that is not accessible to host partition 110. In one embodiment, OOB connection 124 allows traffic analyzer 120 access to a network policy administrator. Through the connection to network interface 130, traffic analyzer 120 can restrict network access from within the platform of system 100. Through the connection to the network policy administrator, traffic analyzer 120 can cause access to network 160 to be restricted from external to the platform of system 100. Either or both restrictions could be enforced in the case of the traffic analyzer detecting traffic of an unrecognized pattern on connection 152. Additionally, the connection over OOB connection 124 can enable traffic analyzer 120 to notify a network administrator (e.g., a human user).

Figure 2:
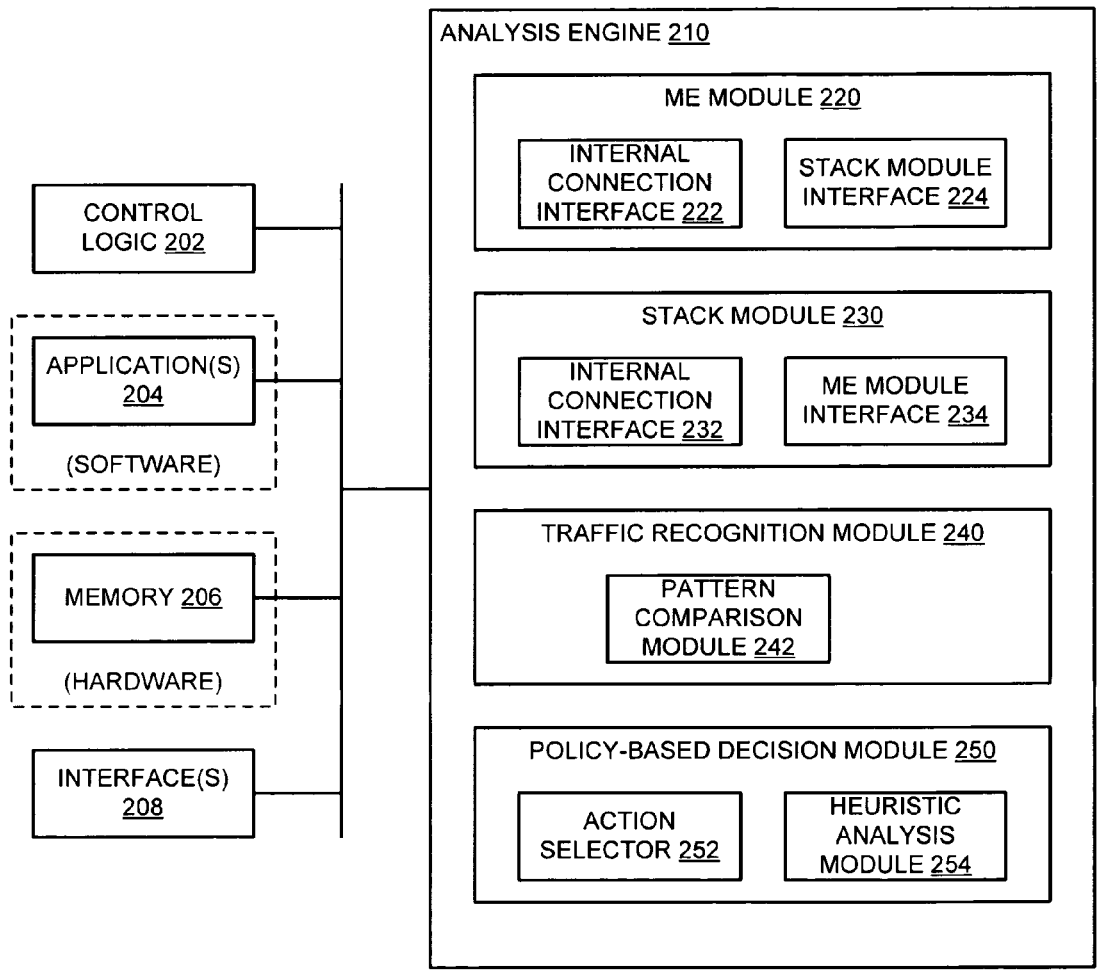
FIG. 2 is a block diagram of an embodiment of a traffic analyzer.

FIG. 2 is a block diagram of an embodiment of a traffic analyzer. Traffic analyzer 200 includes control logic 202, which implements logical functional control to direct operation of traffic analyzer 200, and/or hardware associated with directing operation of traffic analyzer 200. Each of the components represented in traffic analyzer 200 is a means that may be implemented with hardware, software, or a combination. Logic 202 may be hardware logic circuits and/or software routines. In one embodiment, the logic may be instructions executing on a processor of a computing device. Thus, in a software implementation, logic 202 provides instructions for the control of operation of a processor that executes traffic analyzer 200. In a hardware implementation, logic 202 represents circuitry that provides functional control (e.g., outputs on a signal line). Logic 202 may also refer to the operating instructions and circuitry that control, for example, an embedded processor in an implementation with software and hardware combined.

In one embodiment, in an implementation that is partially or wholly software, traffic analyzer 200 includes one or more applications 204, which represent code sequences and/or programs that provide instructions to control logic 202. Applications 204 may be code executing on a common processor that executes traffic analyzer 200.

In one embodiment, traffic analyzer 200 includes memory 206 and/or access to memory resource 206 for storing data and/or instructions. In a hardware implementation, a hardware circuit that represents traffic analyzer 200 may include a memory device. In a software implementation, memory 206 can be understood to refer to the ability of a software module to store data in memory and access registers for the execution of code. Thus, memory 206 may include memory local to traffic analyzer 200, as well as, or alternatively, including memory of a storage server on which traffic analyzer 200 resides.

Traffic analyzer 200 also includes one or more interfaces 208, which represent access interfaces to/from (an input/output interface) traffic analyzer 200 with regard to entities external to traffic analyzer 200. In one embodiment, traffic analyzer 200 is accessible as a component of a system that can be manipulated externally by a user through a user interface. Thus, interfaces 208 may include graphical user interfaces, keyboards, pointer devices, etc., in an implementation where traffic analyzer 200 is accessible to human users. In an alternative embodiment, traffic analyzer 200 executes "behind the scenes" to a human user, meaning the module performs its functions without being visible to the human user. However, even if not visible to a human user as a separate component, traffic analyzer 200 can be accessible to external electronic components, or external software applications. Thus, in one embodiment, interfaces 208 include mechanisms through which external programs may access the module (e.g., drivers in a hardware implementation of traffic analyzer 200, application program interfaces (APIs) in a software implementation, etc.).

Traffic analyzer 200 also includes analysis engine 210, which represents one or more functional components that enable traffic analyzer 200 to provide traffic analysis of an internal connection of a system. Analysis engine 210 may be implemented as hardware and/or software, and provides the functionality of traffic analyzer 200. The functions or features of the components include, or are provided by, one or more means, management engine (ME) module 220, stack module 230, traffic recognition module 240, policy-based decision module 250, and heuristic analysis module 260. Each module may further include other modules to provide specific functionality. As used herein, a module refers to routine, a subsystem, etc., whether implemented in hardware, software, or some combination. One or more modules can be implemented as hardware while other(s) are implemented in software.

In one embodiment, analysis engine 210 includes ME module 220, which enables traffic analyzer 200 to be implemented in a management engine or other hardware component of the hardware platform. ME module 220 includes internal connection interface 222 to couple traffic analyzer 200 to an internal connection. For example, one or more signal lines may couple the ME to the host partition that generates traffic. Traffic is sent from the host partition to the ME via a driver. Through the interface, analysis engine 210 can monitor/analyze the traffic on the connection. Thus, traffic analyzer 200 receives traffic over internal connection interface 222 and is able to monitor the traffic received. In one embodiment, traffic analyzer 200 includes elements on an ME and as part of a VM stack (e.g., a VM configured as a VMM service partition). In such embodiments, ME module 220 may include stack module interface 224 to allow cooperation between the components of the ME and the VM stack. The interface can be, for example, access to the ME through a driver.

In one embodiment, analysis engine 210 includes stack module 230, which enables traffic analyzer 200 to be implemented in a VM stack. Stack module 230 internal connection interface 232, which may be a driver or other software component that couples the VM with the traffic analyzer (which may be referred to as a "monitoring VM") to an internal connection established by the VMM (not shown). Traffic is monitored by analysis engine 210 on the internal connection through the interface. Similar to internal connection interface 222 described above, internal connection interface 232 enables traffic analyzer 200 to receive traffic from the internal connection and monitor the traffic received. In one embodiment, traffic analyzer 200 includes elements on an ME and as part of a VM stack. In such embodiments, stack module 230 may include ME module interface 234 to allow cooperation between the components of the ME and the VM stack. For example, the interface can be a driver or other software component.

Traffic recognition module 240 enables traffic analyzer 200 to determine whether traffic on the internal connection is within or outside expected bounds for traffic on the internal connection. Traffic recognition module 240 includes pattern comparison module 242 that enables analysis engine 210 to compare traffic patterns on the internal connection to expected patterns. As mentioned above, the pattern may be any of: no traffic, traffic according to a specific port or protocol, traffic having a particular tag or header, or any other established bounds. The results of the comparison of traffic patterns to expected patterns may trigger or cause traffic analyzer 200 to perform any of a number of policy-based actions.

Policy-based decision module 250 enables traffic analyzer 200 to perform an action appropriate to an observed traffic pattern on the internal connection. Policy-based decision module 250 may include action selector 252 to indicate the appropriate policy action for a particular internal connection. The policy may change as the monitored connection changes in different implementations. For example, in particular implementations, action selector 252 is configured to simply notify an administrative entity of traffic outside expected bounds. In other implementations, the policy may indicate that one or more ports and/or protocols should be restricted (e.g., reduced traffic allowed), or should shut down completely. Action selector 252 can be configured for such actions. Action selector 252 could be implemented, for example, as a look-up table, a pre-configured action, or as a heuristic analysis. In one embodiment, analysis engine 210 includes heuristic analysis module 254, which enables traffic analyzer 200 to perform policy-based actions based on heuristic analysis. A heuristic analysis can be seen in one embodiment as a coordinated effort between multiple decision-making engines (for example, one in the ME and one in the VMM). A heuristic analysis may consider the extent to which the traffic pattern differs from the expected pattern. Heuristics may be used to consider how aggressively the internal connection is being attacked, which may suggest a different policy action is preferable (e.g., notify if some traffic received and filter the output ports of the network interface if a certain amount of unexpected traffic is received within a threshold time, etc.). Such heuristic analysis requires more computing power than pre-configured actions. In one embodiment, heuristic analysis is performed only if both ME and VMM stack components are employed to implement traffic analyzer 200.

The descriptions herein of managers or modules, describe components that may include hardware, software, and/or a combination of these. In a case where a component to perform operations described herein includes software, the software data, instructions, and/or configuration may be provided via an article of manufacture by a machine/electronic device/hardware. An article of manufacture may include a machine readable medium having content to provide instructions, data, etc. The content may result in an electronic device as described herein, performing various operations or executions described. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 3:
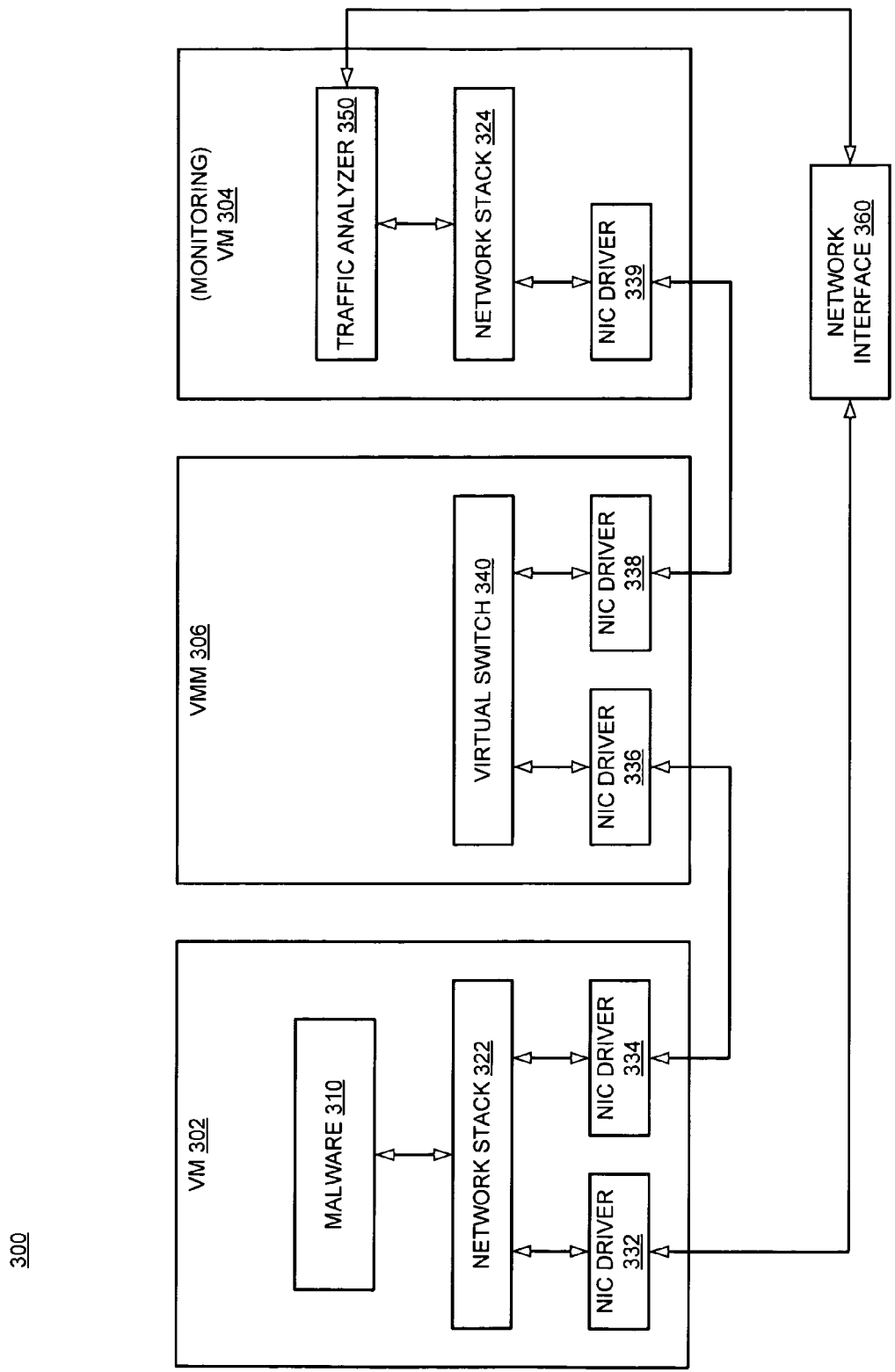
FIG. 3 is a block diagram of an embodiment of a system having a traffic analyzer in a network stack of a virtual machine.

FIG. 3 is a block diagram of an embodiment of a system having a traffic analyzer in a network stack of a virtual machine. System 300 represents a platform that has multiple virtual machines, among which is VM 302. System 300 also includes VM 304, which is coupled to VM 302 via an internal connection established by VMM 306. VM 302 sends all of its normal network traffic via directed I/O to network interface 360 (the physical network interface device, e.g., network interface card (NIC)), rather than sending all traffic through VMM 306. In one embodiment, VMM 306 creates a virtual network for privately connecting VMs in system 300, including VMs 302 and 304. A guest area network (GAN) is established in system 300 as an internal only network between VM 302 and VM 304, and other VMs (not shown), and VMM 306. In one embodiment, traffic analyzer 350 is included within VM 304. For example, traffic analyzer 350 could reside in the network stack at a same level as a firewall. In one embodiment, traffic analyzer 350 is part of a firewall.

In one embodiment, traffic analyzer 350 resides on VM 302, which may be a dedicated management partition, and which may be referred to as a monitoring VM. The illustration of traffic analyzer 350 in VM 304 is to be understood as merely one example implementation, and others are possible.

If malware 310 compromises the operating system of VM 302, malware 310 will query the host OS for available networks. The available networks will be known to network stack 322, which malware 310 will invoke to spread itself. To malware 310, NIC driver 332 and NIC driver 334 appear to be available external network connections, even though NIC driver 332 is the directed I/O external network connection and NIC driver 334 controls access to the GAN. At some point in time, malware 310 will attempt to access the GAN (the internal connection or the private network). Thus, malware 310 will send outbreak traffic over the GAN to VMM 306 and to VM 304 where traffic analyzer 350 resides.

VMM 306 receives the outbreak traffic at NIC driver 336, and routes the outbreak traffic via virtual switch 340 through NIC driver 338 to VM 304 at NIC driver 339. Virtual switch 340 represents one or more modules that allow the connection of VMs to the internal network (the GAN, or the internal connection) and generally to other networks (e.g., networks connected to network interface 360). The traffic will have a particular pattern, depending on the port and protocol used by malware 310 to transmit the outbreak traffic. Traffic from NIC driver 338 to VM 304 is provided up to network stack 324 from NIC driver 339, and then to traffic analyzer 350. In other embodiments, traffic analyzer 350 can exist at a different point place in the stack.

Traffic analyzer 350 performs analysis on all traffic it receives on the internal connection. In one embodiment, no traffic should be transmitted on the internal connection. VM 304 can assign the medium(a) access control (MAC) addresses for virtual NICs on the internal connection. Thus, if traffic is detected on the internal connection, traffic analyzer 350 determines that malware generated the traffic. Based on the MAC address for the virtual NIC that generated the traffic (i.e., NIC driver 334 with which malware 310 generated the traffic), traffic analyzer 350 identifies VM 302 as the source of the malware traffic. In one embodiment, traffic analyzer 304 sets parameters in network interface 360 to filter network traffic. Thus, infected VM 302 can be restricted from any network access, or be restricted to a remediation network, etc. Alternatively, traffic analyzer 350 can set network interface 360 to completely block network access to VM 302 through network interface 360. In one embodiment, traffic analyzer alerts an operator of the malware infection.

Once VM 302 has been disinfected and repaired from malware 310, VM 302 can petition for access over network interface 360 (e.g., connecting to traffic analyzer 350, having a network administrator reset the access, etc.).

Figure 4:
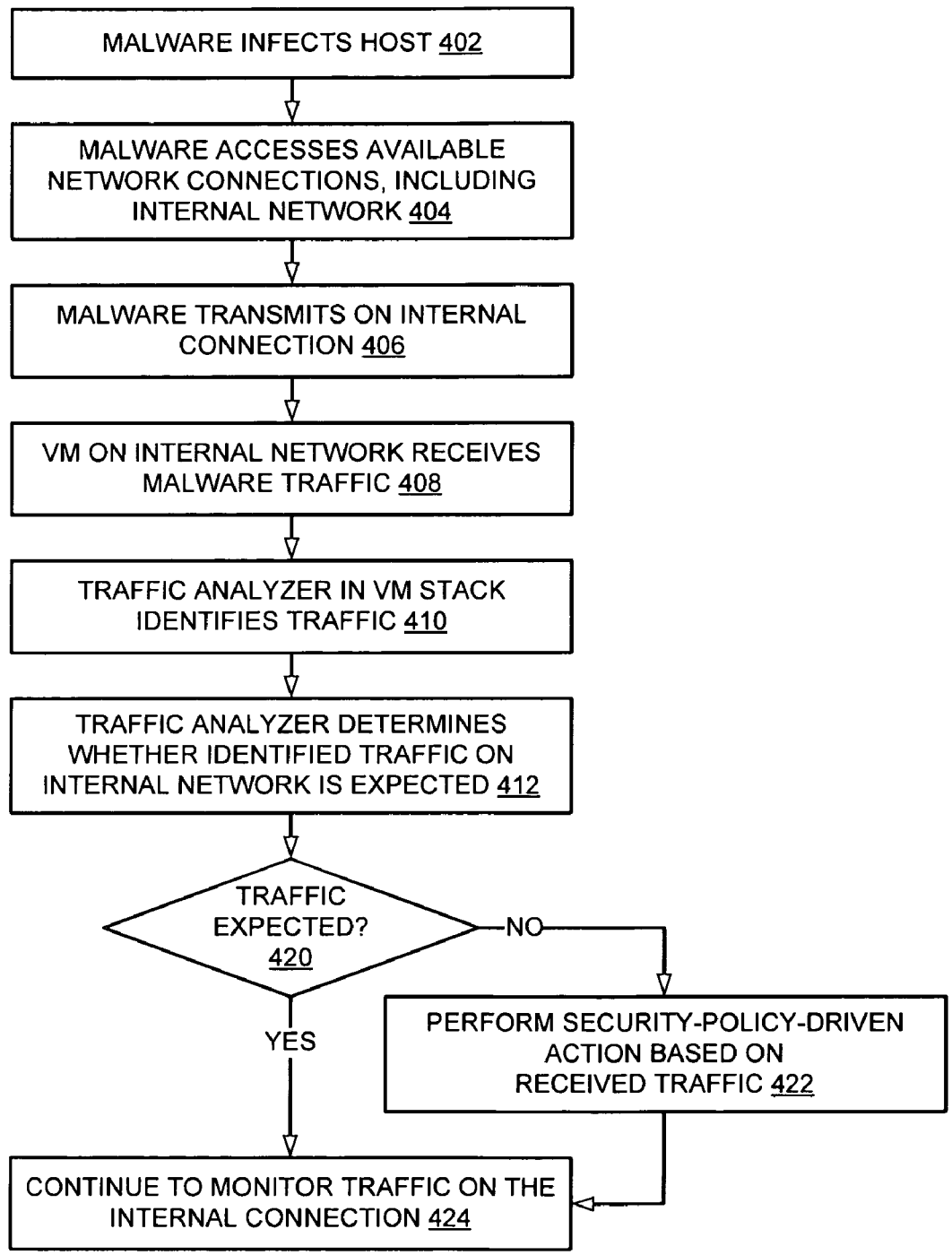
FIG. 4 is a flow diagram of an embodiment of a process for analyzing traffic with a traffic analyzer of a network stack of a virtual machine.

FIG. 4 is a flow diagram of an embodiment of a process for analyzing traffic with a traffic analyzer of a network stack of a virtual machine. Flow diagrams as illustrated herein provide examples of sequences of various operations. Although shown in a particular sequence or order, unless otherwise specified, the order of the operations can be modified. Thus, the illustrated implementations should be understood only as examples, and operations can be performed in a different order, and some operations may be performed in parallel. Additionally, one or more operations can be omitted in various embodiments of the invention; thus, not all operations are required in every implementation. FIG. 4 illustrates one embodiment of a flow for system 300 of FIG. 3. Other flows of operation are possible.

Malware infects a host partition or a VM, 402. To spread, the malware accesses available network connections, including an internal connection monitored by a traffic analyzer, 404. Eventually, the malware transmits on the internal connection, 406. The time period could be seconds, or even hours. However, importantly, there is an extremely high probability that the malware will transmit on the monitored internal connection and thus alert the traffic analyzer.

On the internal connection, the VM or dedicated management partition with the traffic analyzer receives the malware traffic, 408. The traffic analyzer in the stack of the VM identifies the traffic, 410. Identifying the traffic includes determining the pattern of the traffic. The traffic analyzer determines whether the identified traffic on the internal connection is expected, or whether it is of an unexpected pattern, 412. If the traffic is not expected, 420, the traffic analyzer performs one or more security-policy driven action(s) based on the received traffic, 422. If the traffic is expected (which should be the case only if it is not the malware traffic), 420, the traffic analyzer continues to monitor the traffic patterns of the traffic on the internal connection, 424.

Figure 5:
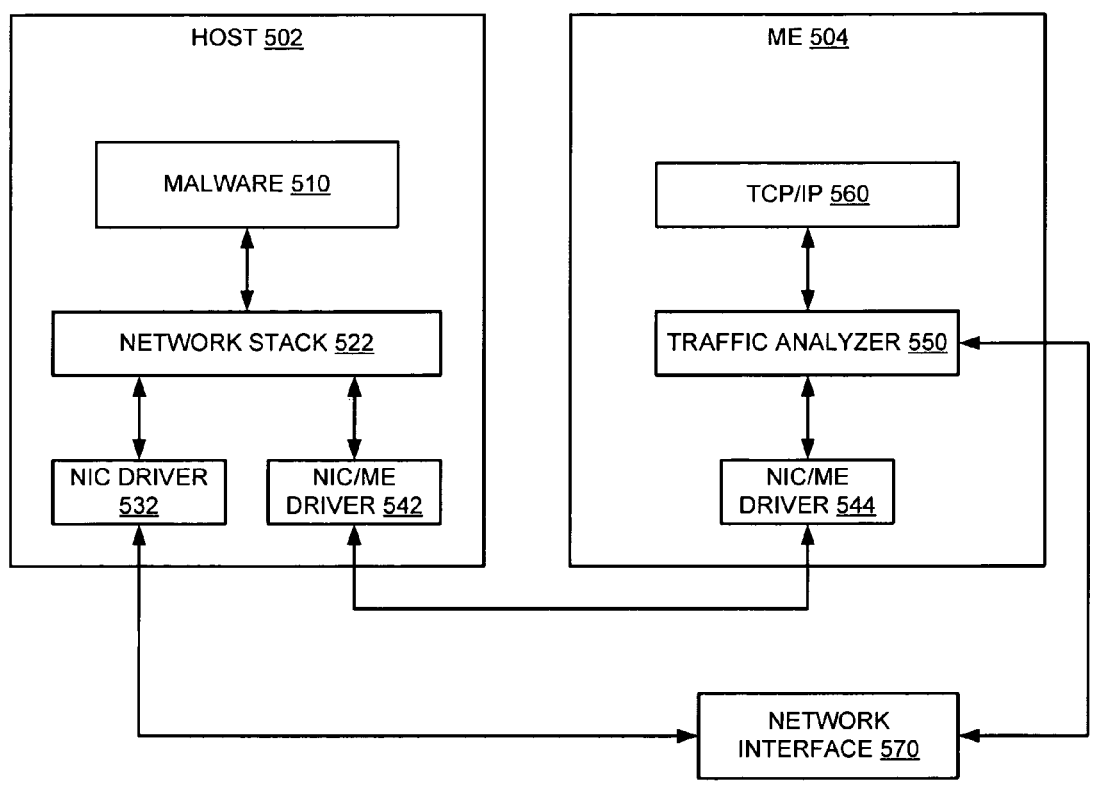
FIG. 5 is a block diagram of an embodiment of a system having a traffic analyzer in an management engine.

FIG. 5 is a block diagram of an embodiment of a system having a traffic analyzer in a management engine. In one embodiment, a single host 502 is coupled to ME 504. ME 504 includes traffic analyzer 550 that can monitor traffic that comes over an internal connection with host 502. The internal connection may be, for example, a management communication link. Host 502 communicates with ME 504 by generating traffic and sending it via network stack 522 over NIC/ME driver 542 to ME 504. If malware 510 infects host 502, NIC/ME driver 542 will appear to the malware like another network connection. ME 504 receives traffic on the internal connection at NIC/ME driver 544, which is analyzed by traffic analyzer 550 and sent to the network stack, as illustrated by TCP/IP 560.

If a worm or other malware 510 infects host 502, the malware queries the OS for available networks. Sooner or later, malware 510 generates outbreak traffic and sends it over the internal connection via NIC/ME driver 542. Traffic received over the internal connection is monitored for one or more patterns by traffic analyzer 550. Traffic patterns outside the expected patterns are detected by traffic analyzer 550 as outbreak traffic. For example, traffic that is not management traffic received at NIC/ME driver 544 would be considered outside an expected pattern. After identifying traffic as outside an expected pattern, traffic analyzer 550 can perform further analysis on the traffic, such as determining the origin, attempting to identify a worm signature, etc.

Traffic analyzer 550 is coupled to network interface 570, which handles traffic outbound from system 500 to an external network. In one embodiment, traffic analyzer 550 can instruct network interface 570 to filter outbound traffic originating from host 502 to restrict network access and contain malware 510. Additionally, or alternatively, traffic analyzer 550 can send an alert to a remote administrator. Thus, although host 502 includes a direct external network connection via NIC driver 532, traffic generated within host 502 may be contained.

Figure 6:
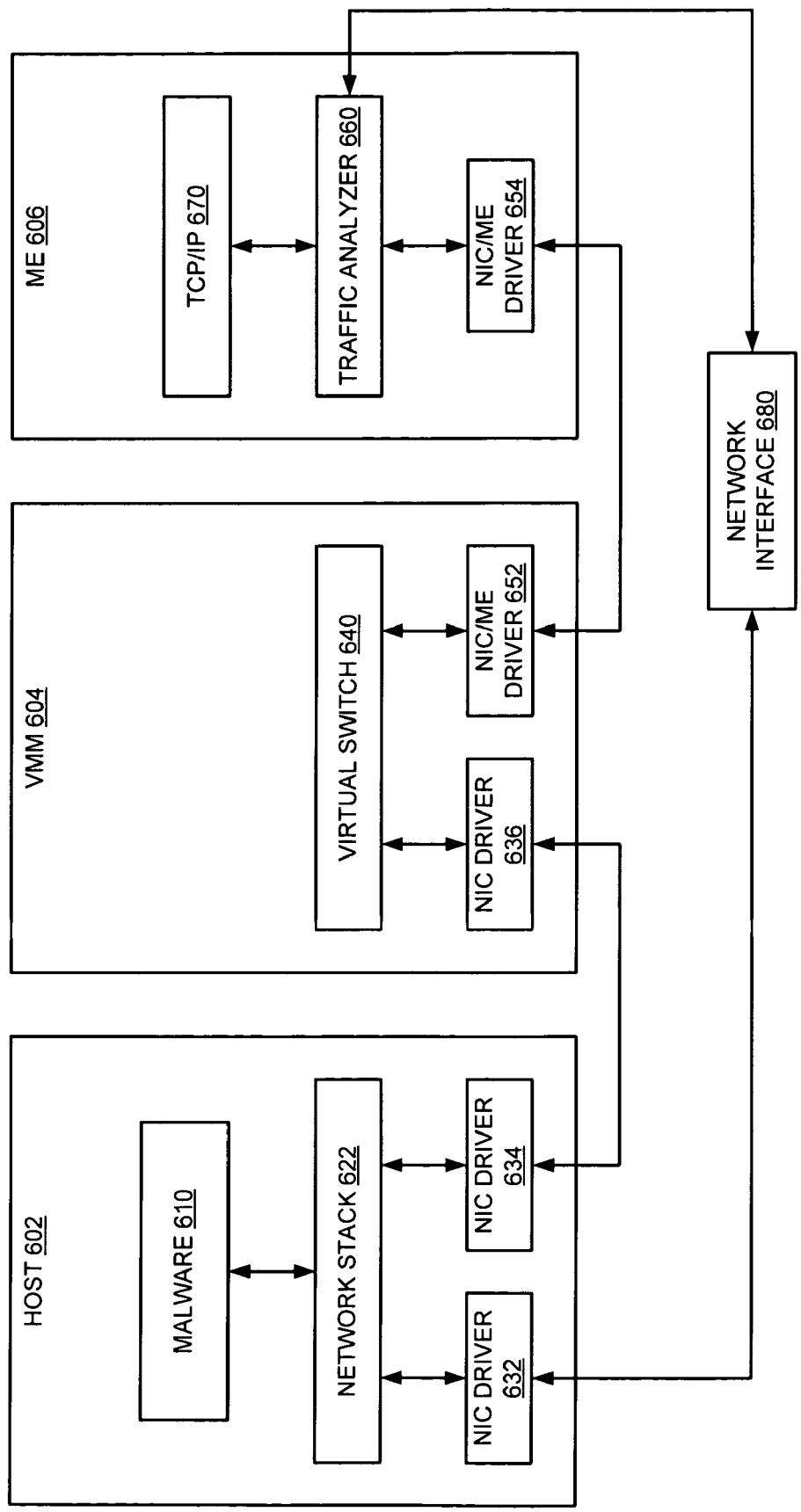
FIG. 6 is a block diagram of an embodiment of a system having a management engine with a traffic analyzer, coupled to a virtual machine manager.

FIG. 6 is a block diagram of an embodiment of a system having a management engine with a traffic analyzer, coupled to a virtual machine manager. System 600 includes host 602, VMM 604, and ME 606. Host 602 may be, for example, one or multiple VMs of system 600. Host 602 includes network stack 622, and performs normal network traffic exchanges via NIC driver 632, which connects directly to network interface 680. Network stack 622 is also coupled to NIC driver 634, which provides an internal connection, or a connection to an internal network.

In one embodiment, VMM 604 includes virtual switch 640 to provide the internal network. Virtual switch 640 is coupled to NIC/ME driver 652, which provides a link to ME 606, and can be accessed by VMs coupled to the internal connection. Generally, all traffic on the internal connection is passed to VMM 604 with virtual switch 640, and routed to its destination on the internal network. ME 606 in turn includes NIC/ME driver 654 to connect to the internal connection. ME 606 includes traffic analyzer 660 to monitor the internal connection. Traffic analyzer can monitor traffic on the internal connection and provide it to TCP/IP 670. VMM 604 treats ME 606 as a shared network interface for all virtual machines of system 600, and presents ME 606 as another network interface resource to each VM. Traffic from host 602 or another VM goes from the VM to virtual switch 640, and is then routed to ME 606. VMM 604 manages the sharing of ME 606 as a resource by assigning separate IP/MAC addresses for the interface to each VM of system 600.

If malware 610 infects host 602, the malware will query the OS of host 602 for available network connections. Eventually malware 610 will send outbreak traffic over the internal connection, which will make its way to virtual switch 640, and then be routed to ME 606. Once at ME 606, the outbreak traffic is detected by traffic analyzer 660, for example, because it is not management traffic, or has some other observable pattern distinction from traffic expected to be received over the internal connection. Traffic analyzer 660 can analyze the outbreak traffic and determine the source of the outbreak traffic, including the fact that malware 610 originated the traffic.

When the traffic is detected, traffic analyzer can perform any of a number of security-policy based actions. In one embodiment, traffic analyzer 660 sets a containment filter in network interface 680, which restricts traffic from host 602. In one embodiment, traffic analyzer 660 alerts an operator of host 602 and/or a remote administrator.

Figure 7:
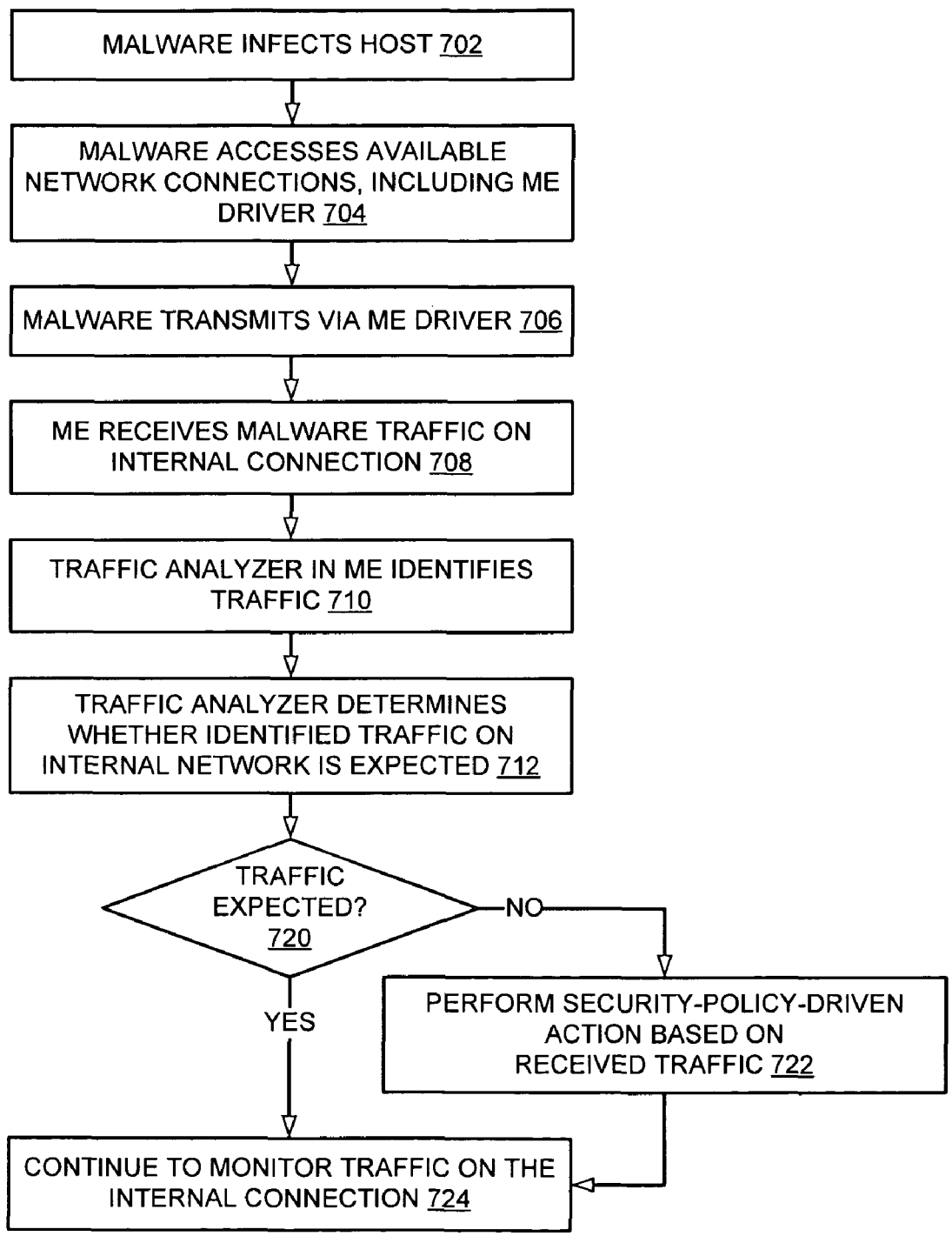
FIG. 7 is a flow diagram of an embodiment of a process for analyzing traffic with a traffic analyzer of a management engine.

FIG. 7 is a flow diagram of an embodiment of a process for analyzing traffic with a traffic analyzer of a management engine. Malware infects a host virtual machine, 702. The malware accesses available network connections, including an ME driver, 704. The ME driver may be accessed directly in the case where the host has a driver and a direct connection to the ME, or it may be accessed through a virtual switch on a VMM that presents the ME as a shared network resource.

The malware transmits outbreak traffic via the ME driver, 706. A traffic analyzer at the ME monitors the traffic on the connection accessed via the ME driver, and observes patterns of the traffic on the connection. The ME receives the malware traffic on the internal connection via the ME driver, 708. The traffic analyzer in the ME identifies the traffic, 710. The traffic analyzer determines whether the identified traffic on the internal network has an expected pattern, 712. Based on the traffic analysis, the traffic analyzer performs a policy-based action. For example, if the traffic is not expected, meaning it does not have an expected pattern, 720, the traffic analyzer performs a security-policy-driven action based on the received traffic, 722. The action based on the received traffic may include taking certain actions based on the traffic pattern, or based on a signature found in the traffic, etc. If the traffic is expected, 720, the policy-based action may be to do nothing with the traffic, and the traffic analyzer continues to monitor traffic on the internal connection, 724.

Figure 8:
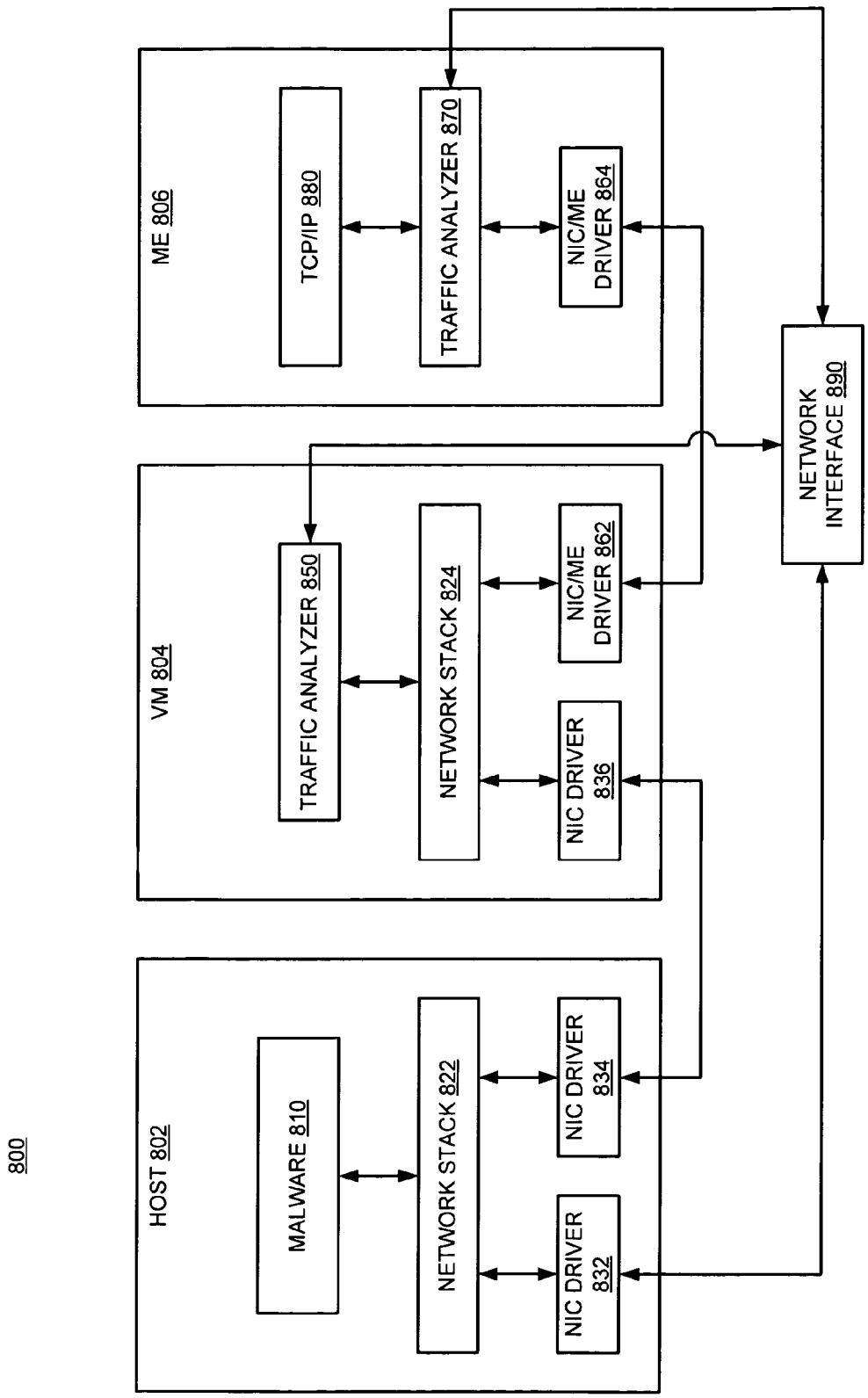
FIG. 8 is a block diagram of an embodiment of a system having a management engine with a traffic analyzer, coupled to a virtual machine monitor with a traffic analyzer in a network stack.

FIG. 8 is a block diagram of an embodiment of a system having a management engine with a traffic analyzer, coupled to a virtual machine monitor with a traffic analyzer in a network stack. System 800 is similar to system 600 of FIG. 6. System 800 includes host 802 that has network stack 822 responsive to a host operating system. Network stack 822 includes access to an external network via NIC driver 832 directly coupled to network interface 890. Network stack 822 also includes access to an internal network via NIC driver 834, which directs traffic to NIC driver 836 of VM 804, which provides the traffic to a virtual switch on the VMM (not shown) for routing (e.g., to other VMs, to ME 806, or other devices sharing the internal network). VM 804 may be implemented as a monitoring VM in the system.

VM 804 includes NIC/ME driver 862 to couple VM 804 to ME 806 via NIC/ME driver 864. In one embodiment, VM 804 includes network stack 824 and traffic analyzer 850. Additionally, ME 806 includes traffic analyzer 870 and TCP/IP 880. Traffic analyzer 850 and traffic analyzer 870 represent cooperative traffic analyzer elements of system 800. With cooperative elements, all functions described in previous system configurations can be performed, as well as more complex analysis. The cooperation of the various traffic analyzer elements provides additional computational resources, which may allow the performance of more in-depth traffic analysis and the application of more complex heuristic algorithms, as compared to having a single traffic analyzer.

Figure 9:
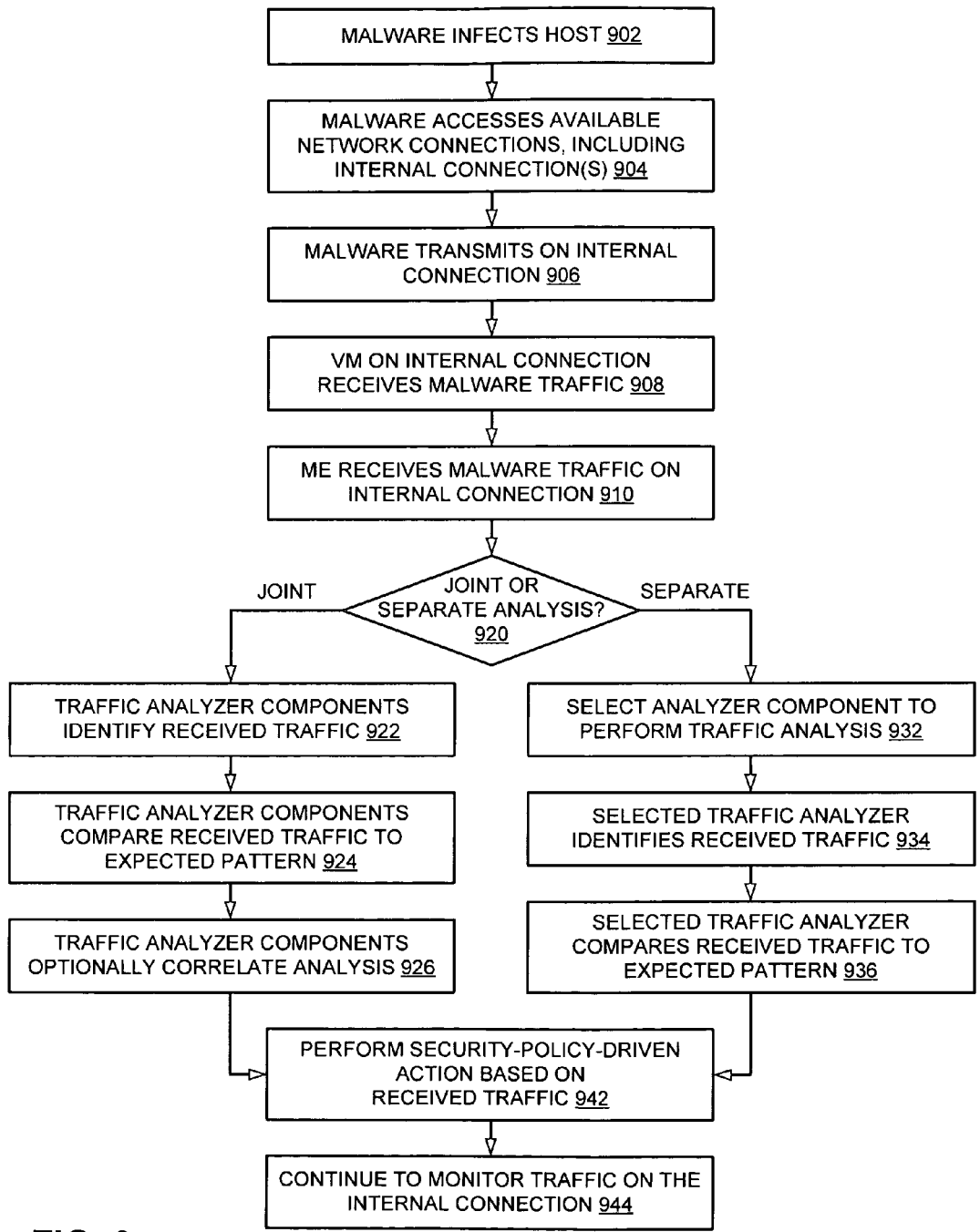
FIG. 9 is a flow diagram of an embodiment of a process for analyzing traffic with a traffic analyzer of a management engine, and a traffic analyzer of a monitoring virtual machine.

FIG. 9 is a flow diagram of an embodiment of a process for analyzing traffic with a traffic analyzer of a management engine, and a traffic analyzer of a monitoring virtual machine.

A traffic analyzer monitors an internal connection available to a computing device. Malware infects the host computing device, 902, which may be a VM of a virtualized computing environment. The malware accesses available network connections, including one or more internal connection, 904. The host may be connected to an internal network and/or another dedicated internal connection, such as via an ME driver to an ME. The malware transmits outbreak traffic on the internal connections to which it has access, 906. A VM or dedicated partition having a traffic analyzer on the internal connection receives the malware traffic, 908. The traffic could be forwarded to an ME coupled to the VM or dedicated partition with the traffic analyzer. An ME with a traffic analyzer receives the malware traffic on the internal connection, 910.

Thus, two separate entities on the internal network having traffic analyzer components can monitor an internal connection. The analysis provided can be performed jointly, or alternatively, separately. If the analysis is joint, 920, both traffic analyzer components participate in the monitoring and analysis, 922-926. If the analysis is separate, 920, a traffic analyzer is selected, which then performs monitoring and/or analysis, 932-936. In one embodiment, one traffic analyzer component could monitor for unexpected traffic and the other component determine what action to perform. One component could perform a general or high-level filter of traffic on the internal connection, and the other could perform a more specific or detailed analysis.

In an embodiment with a joint analysis, traffic analyzer components identify received traffic on the internal network, 922. The traffic analyzer components compare the received traffic to expected pattern(s) of traffic for the internal connection, 924. The traffic analyzer components can optionally correlate their separate analyses, 926.

In an embodiment with a separate analysis, a traffic analyzer component is selected to perform traffic analysis, 932. Additionally, depending on the implementation, one could be selected to perform monitoring and another traffic identification, policy action selection, etc. The selected traffic analyzer identifies the received traffic, 934. The selected traffic analyzer compares the received traffic to an expected pattern, 936.

One or both traffic analyzer components select and perform a security-policy-driven action based on received traffic, 942. The monitoring of the traffic on the internal connection by one or both traffic analyzer components continues, 944.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for network traffic analysis, comprising:
receiving network traffic at a traffic analyzer of a computing device over an internal connection of the computing device, the internal connection shared by components of a hardware platform of the computing device and accessible only to the components of the hardware platform, wherein the internal connection is identified to the components as an available network port in response to a query for an available network connection, the computing device coupled to an external network through an external connection different from the internal connection to connect to entities external to the hardware platform;

comparing a traffic pattern of the network traffic received over the internal connection to an expected pattern with the traffic analyzer;

determining an action with the traffic analyzer from a security policy associated with the traffic analyzer based on a result of the comparing of the traffic pattern to the expected pattern; and performing the determined action.

2. The method of claim 1, wherein receiving network traffic at the traffic analyzer comprises:

receiving the network traffic at an embedded management engine of the computing device.

3. The method of claim 1, wherein receiving network traffic at the traffic analyzer comprises:

receiving the network traffic at a virtual machine of the computing device.

4. The method of claim 1, wherein receiving the network traffic over the internal connection comprises:

receiving the network traffic via a network interface driver.

5. The method of claim 1, wherein receiving the network traffic over the internal connection comprises:

receiving the network traffic over a network internal to the computing device and private to virtual machines of the computing device.

6. The method of claim 1, wherein comparing the traffic pattern to the expected traffic pattern comprises:

determining whether there is network traffic on the internal connection when no network traffic should be on the internal connection.

7. The method of claim 1, wherein comparing the traffic pattern to the expected traffic pattern further comprises:

identifying a type of the network traffic; and determining whether the type of the network traffic is a type of traffic expected on the internal connection.

8. The method of claim 1, wherein performing the determined action comprises:

reporting the results of the comparing to a security policy enforcement entity.

9. The method of claim 1, wherein performing the determined action comprises:

limiting traffic on a network interface of the computing device.

10. The method of claim 9, wherein limiting traffic on the network interface comprises:

disabling the network interface to all network traffic.

11. An article of manufacture comprising a machine-readable storage medium, wherein the storage medium is not a signal having content stored thereon to provide instructions to result in a device performing operations including:

monitoring network traffic of an internal connection of a computing device with a traffic analyzer connected to the internal connection, the internal connection shared by components of a hardware platform of the computing device and accessible only to the components of the hardware platform, wherein the internal connection is identified to the components as an available network port in response to a query for an available network connection, the computing device coupled to an external network through an external connection different from the internal connection to connect to entities external to the hardware platform;

comparing with the traffic analyzer a traffic pattern of the network traffic to an expected pattern;

determining an action with the traffic analyzer from a security policy associated with the traffic analyzer based on a result of the comparing of the traffic pattern to the expected pattern; and performing the determined action.

12. The article of manufacture of claim 11, wherein the content to provide instructions for monitoring network traffic on the internal connection of the system comprises content to provide instructions for:

monitoring a specific port of the computing device.

13. The article of manufacture of claim 12, wherein the content to provide instructions for monitoring the specific port of the system comprises content to provide instructions for:

monitoring a specific protocol port.

14. The article of manufacture of claim 11, wherein the content to provide instructions for comparing the traffic pattern of the network traffic to the expected pattern comprises content to provide instructions for:

identifying a protocol of the network traffic; and comparing the identified protocol to an expected protocol.

15. A traffic analyzer disposed on a hardware platform of a computing device, comprising:

an internal connection interface coupled to an internal connection of the computing device, the internal connection interface to receive traffic from the internal connection, the internal connection shared by components of a hardware platform of the computing device and accessible only to the components of the hardware platform, wherein the internal connection is identified to the components as an available network port in response to a query for an available network connection, the internal connection separate from an external connection to connect the computing device to entities external to the hardware platform;

a traffic recognition module coupled to the internal connection interface to compare the received traffic to an expected traffic pattern to generate a traffic pattern comparison result; and a policy-based decision module to select a policy-driven action in response to the generated traffic pattern comparison result.

16. The traffic analyzer of claim 15, wherein the internal connection interface comprises part of a management engine module that provides traffic analysis capability to a management engine of the computing device.

17. The traffic analyzer of claim 15, wherein the internal connection interface comprises part of a module that provides traffic analysis capability to a VM of the computing device.

18. The traffic analyzer of claim 15, further comprising:

a heuristic analysis module coupled to the policy-based decision module, the heuristic analysis module to coordinate an analysis of multiple policy decision engines.

19. A computing device comprising:

a traffic analyzer having an internal connection interface coupled to an internal connection of a computing device, the internal connection interface to receive traffic from the internal connection, the internal connection shared by components of a hardware platform of the computing device and accessible only to the components of the hardware platform, wherein the internal connection is identified to the components as an available network port in response to a query for an available network connection, the internal connection separate from an external connection to connect the computing device to entities external to the hardware platform on an external network, a traffic recognition module coupled to the internal connection interface to compare the received traffic to an expected traffic pattern to generate a traffic pattern comparison result, and a policy-based decision module to select a policy-driven action in response to the generated traffic pattern comparison result; and an out-of-band (OOB) channel to the external network coupled to the traffic analyzer, the OOB channel coupled to a network administrator of the external network.

20. The system of claim 19, wherein the policy based decision module selects a policy-driven action of restricting network access to an originator of the traffic from which the traffic pattern comparison result was generated.

21. The system of claim 20, wherein the policy based decision module further provides parameters to a network interface device to restrict the network access of the originator.

* * * * *